(12) United States Patent
Wu et al.

(10) Patent No.: US 6,947,942 B1
(45) Date of Patent: Sep. 20, 2005

(54) METHODS OF MANAGING USER AND COMPUTER OBJECTS IN DIRECTORY SERVICE

(75) Inventors: Yu-Fu Wu, Chiai (TW); Swidom Lin, Taipei (TW); Hawk Chang, Shinjuang (TW); Jo Lee, Yunlin (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 445 days.

(21) Appl. No.: 10/159,200

(22) Filed: May 30, 2002

(51) Int. Cl.[7] .......................................... G06F 17/30
(52) U.S. Cl. ...................... 707/100; 707/201; 705/1
(58) Field of Search ................. 707/100, 201; 709/203, 223; 705/1; 717/101

(56) References Cited

U.S. PATENT DOCUMENTS

| | | | | |
|---|---|---|---|---|
| 5,664,170 A | * | 9/1997 | Taylor | 709/220 |
| 5,838,923 A | * | 11/1998 | Lee et al. | 709/236 |
| 5,893,107 A | | 4/1999 | Chan et al. | 707/103 |
| 6,049,776 A | * | 4/2000 | Donnelly et al. | 705/8 |
| 6,141,778 A | * | 10/2000 | Kane et al. | 713/201 |
| 6,144,959 A | | 11/2000 | Anderson et al. | 707/9 |
| 6,341,267 B1 | * | 1/2002 | Taub | 705/11 |
| 6,640,216 B1 | * | 10/2003 | Loofbourrow et al. | 706/45 |
| 6,647,393 B1 | * | 11/2003 | Dietterich et al. | 707/102 |

* cited by examiner

Primary Examiner—Greta Robinson
Assistant Examiner—Cheryl Lewis
(74) Attorney, Agent, or Firm—Haynes and Boone, LLP

(57) ABSTRACT

A system and method of inventorying and managing users and their computer workstations in large organizations through automation. Data is organized in two distinctive ways into two computer database directories to allow for compatibility with other key organization databases and different approaches of locating and accounting for users and their computer objects. One directory that is based on organizational structure can be synchronized with the Human Resources (HR) database to determine people movement or job changes. The other directory that is based on physical location of computer workstations can be synchronized with network subnet databases to determine any Internet Protocol address changes. Automatic updating after synchronization in either directory keeps the data as current and accurate as possible. Organizational policy based on an organization's requirements can be applied and enforced when incorporated into the synchronization process. Exception handling allows for maximum flexibility.

22 Claims, 3 Drawing Sheets

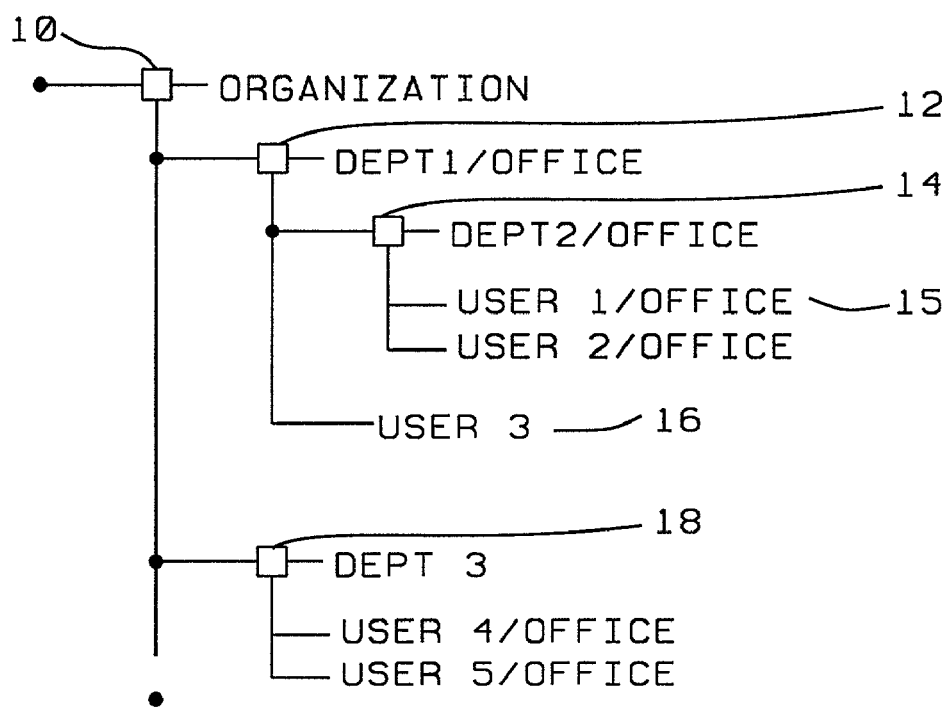
FIG. 1 – Prior Art
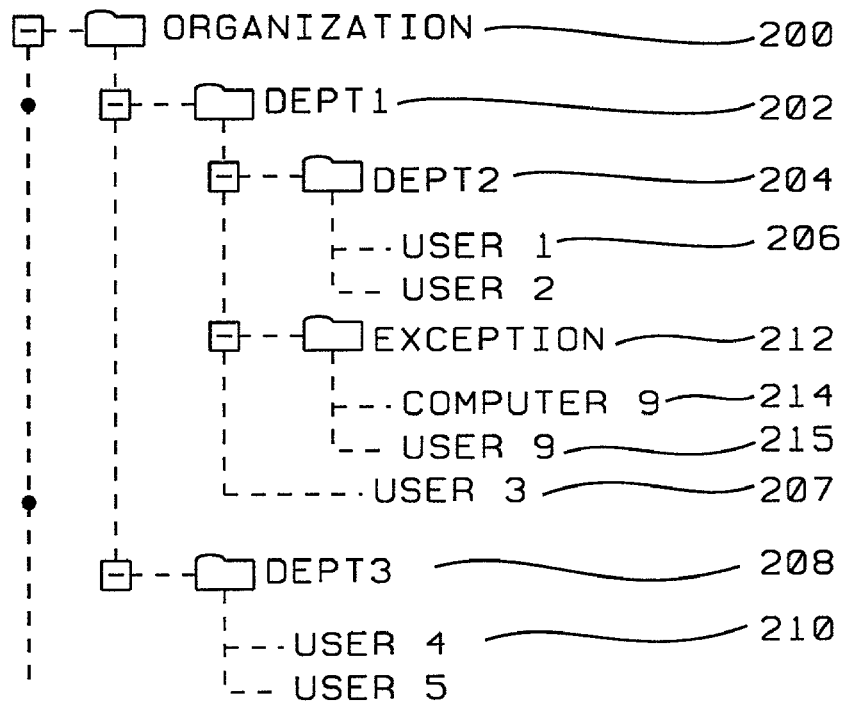
FIG. 2A

METHODS OF MANAGING USER AND COMPUTER OBJECTS IN DIRECTORY SERVICE

BACKGROUND OF THE INVENTION

1. Field of Invention

This invention relates generally to directory service management of users and their computer workstations and, more particularly, to the automation of the administration and inventory of physical computers and their content, peripherals, and users in a large organization.

2. Description of Related Art

In a typical large organization, there are hundreds or thousands of computer workstations used by individuals throughout its many locations. The administration of all these computers becomes a formidable task. Simply knowing exactly where these computers are located can be daunting as their users can be moved to different offices or transferred to different departments or buildings. Frequently the user takes the computer with him, but other times he won't, depending on the policies of the departments involved.

Adding to the complexity, different computers need different tools depending on the area the user is working in. In accounting, the latest spreadsheet software would be needed on the user's computer, while a different operating system for the support of the latest graphic design tools might be needed in engineering. If the user moves from one department to another, it might be necessary to remove certain tools and install others to adapt the computer for its new environment. Knowing what is needed where, a central group can accomplish these computer changes in a timely fashion so the user can be productive right away.

To keep track of computer assets, a central group is usually charged with the responsibility of controlling and maintaining a database that is a directory of all the users and computers owned by the organization. This database is usually kept up-to-date manually, or in some cases the users are expected to update it themselves with various tools that are provided. What frequently happens is that these updates are not made, and the database quickly becomes out-of-date and unreliable. Users begin moving their own workstations and installing and uninstalling their software themselves due to the inability of the central group to provide the services that they require in a timely fashion. Even where strict computer movement rules are enforced, the daunting task of manually keeping the database's location and organizational units (OU) records current often discourages updates, and they are frequently overlooked or ignored. The result is an organization not having a clear accounting of its workstations and how they are being used.

Several methods or systems related to computer management are available. In U.S. Pat. No. 6,144,959 (Anderson et al.) a system and method for the management of user accounts is described. In U.S. Pat. No. 5,893,107 (Chan et al.) a system and method for uniformly accessing multiple directory services is described.

Efficient methods of managing users and their compter objects (computer, software, peripherals) in directory service are needed to automate the process of accounting for and tracking users and their computer workstations. This automation will result in better and more efficient maintenance of workstations, improved tracking of users and workstations, increased productivity of users, and reduced costs.

SUMMARY OF THE INVENTION

This invention's overall objective is to provide a system and method of managing users and their computer objects in real-time, constantly-changing environments of today's large organizations. This invention transforms the process of managing a large number of users and their workstations from a highly manual one to a more automated and easier to use process. Specifically, objectives include creating two main organizational unit directories with the first based on the organization's structure and the second on the physical computer location. This provides two types of searches, increasing the odds of an accurate and successful tracking.

Other objectives are to provide a structural layout for each type of directory for arranging user and computer objects information. Updating of the data can be done in each directory. Another objective is to synchronize the data contained in the organizational structure directory with the Human Resources (HR) database to automatically keep it current with people movement and their job changes. Still another objective is to synchronize the data contained in the physical location directory with network subnets data to determine when computers have been moved.

Additionally, it is an objective to incorporate organizational policies automatically with software programming that would carry out these policies as well as determine when policy infractions have occurred as updates are made. This could be a check for such policy as allowing an individual to have only one computer in a certain department, or ensuring that each user has the latest level of a software program update by a certain date.

Because of possible differences that may exist in any large organizational structure, it is another objective to provide for exception handling for departments or users that do not fit the norm. They can be administered manually and are a part of the structure provided by the invention.

These objectives are met by the method of this invention. This method of managing users and their computer objects provides a very logical, accurate, and workable way of keeping track of an organization's users and computer assets, making it easier to keep each workstation updated with the correct computer objects required for a specific user to do his job.

BRIEF DESCRIPTION OF THE DRAWINGS

This invention will be described with reference to the accompanying drawings, wherein:

FIG. 1 illustrates the prior art directory hierarchy.

FIG. 2A illustrates a directory based on organizational structure in the new method.

DETAILED DESCRIPTION OF THE PREFERRED EMBODIMENT

Figure 2B:
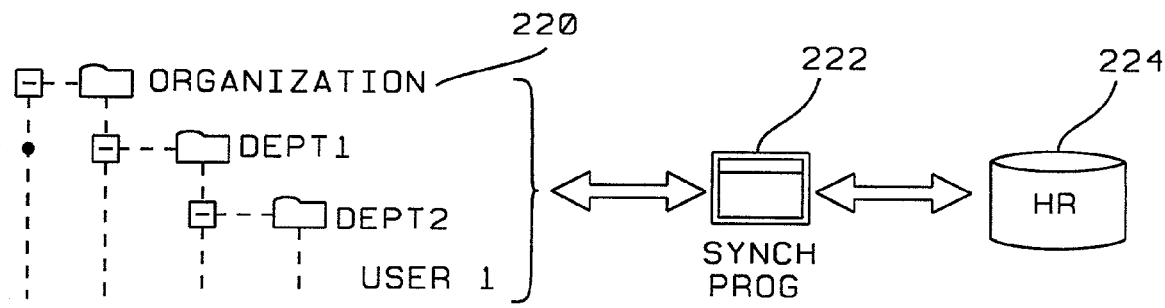
FIG. 2B is a flow diagram showing the synchronization with the HR database.

In large organizations today, almost every person in the organization uses a computer to communicate and do their daily activities. Each computer is uniquely tailored for that user's specific needs by attaching a printer(s), display, mouse, and any other peripherals needed to do the user's required tasks and by adding pertinent computer software programs. Thus, a personal computer workstation is created with the objects (computer, software, and peripherals) that meet the requirements of the user.

The cost of this workstation asset to the organization is enormous, often being many thousands of dollars. Keeping track of this costly asset is essential for basic inventory control and is usually done by a centralized inventory control group or financial group. As a user changes locations or departments within the organization, it is necessary to either move the workstation or supply another workstation configured with the objects used in that department. This becomes a complex task under old methods that simply organize workstation assets by the structure of the organization. Frequently when a user moves to another location in the organization he physically takes the workstation with him without notifying the central inventory control group. Over time, the database becomes inaccurate and requires a complete and costly manual inventory to correct it entailing the laborious job of reconciling the user and computer objects changes and reentering them into the database.

FIG. 1 illustrates how prior art database directories or methods of classification are structured. They are organized using the hierarchy of a business or group. The root node represents the overall organization 10 and would have departments (perhaps tiered) off from it such as Dept1 12. The database node for Dept1 would contain information about the department and its office location. Dept2 14 is a subdepartment of Dept1 and has two users with workstations. User1 15 node contains the detail of the workstation in a format that can be easily extracted when needed. Such things as the name of the user, his office location, the serial number of the computer, and all computer objects that are part of the workstation are recorded in this node. Likewise for the other users in the department. If a new user joins Dept1 12 as was the case of User3 16, he is added directly to the node of Dept 1. Dept3 18 is another department on the same tier as Dept. 1 with two users and workstations. Departments are added to the database structure as required by the organizational structure.

This popular type of database directory structure in FIG. 1 is simple to create and data is entered easily. The problems arise when changes occur in departments and locations. Since the updating is usually done manually by a central group or by an interface program in which the users themselves do the changes, the updating is frequently forgotten or done incorrectly. Over time, the database becomes so inaccurate that a full manual inventory is required to account for the users and computer objects. This inventory is expensive since it requires active participation of the users to document what their workstation contains and is limited to only what the user describes on the inventory documentation. Users may have moved to different departments or locations within the organization, swapped workstations with other people or may have left the organization entirely. Trying to reconcile these changes with the existing database can be very difficult. Thus, users and computer objects can become unknown to the organization in a short amount of time. Without a comprehensive and accurate asset inventory with information about the users and computer objects that make up a workstation, it is difficult to keep these workstations properly updated and maintained. This single structure directory database approach limits automation potential because of its incompatibility with key company databases due to its structure.

This invention provides solutions to these problems. The invention separates the current database directory to form two directory classification choices for easier locating. One directory is based on organizational hierarchy and the other on physical location. With a dual structure, each layout now has compatibility with a different key company database to make it possible for synchronization. The result is automated updating potential and a more accurate and current inventory. The organizational computer database directory is synchronized with the Human Resource (HR) database (frequently updated by Human Resources) through a sync program to catch personnel changes that might change organization and user information. The physical location computer database directory is synchronized with a network subnet computer database (showing the Internet Protocol (IP) addresses and physical location of each workstation's office port) through a sync program. This will catch IP address changes, thus indicating the relocation of a computer. The network subnet database is controlled by a central network administration group and is kept current to solve day-to-day network problems and assign new users to the correct networks.

FIG. 2A illustrates the layout of the organizational directory computer database structure 200. It looks very much like the prior art implementation with the exception that no physical location information is included in the nodes and there is a clear node to handle exceptional cases. Department nodes, like Dept1 202 are created off the root. Additional subdepartments in the organizational hierarchy are created, such as Dept2 204 that is a subdepartment of Dept1. User nodes, such as User1 206 are added and contain pertinent information such as the name of the user, the serial number of the computer, and all objects that are part of the workstation as before. Additional departments, such as Dept3 208, and their users 210, are added as required to represent the organizational structure.

A new node is created that allows exceptions to the organizational policies 212. This is needed because the method will rely on a computer program to synchronize the data with the HR database. As it is not always practical to change the HR database, there must be allowances for exceptions that occur. An example would be Computer9 214 which might not be assigned to a person but used in a common area. Another example would be User9 215. This user might be on loan to a department for a few months and his status not changed in the HR database. This way the workstation or user could still be tracked. These exceptions are managed manually and can represent any criteria that an organization requires.

FIG. 2B shows the flow of running the synchronization program. The organizational directory database 220 is run against the HR database 224 by using the sync program 222. The sync program is a software program that has been created to compare both databases to identify changes such as department moves and new or removed users. The sync program can be written to automatically update the organizational directory database to match the HR database (which is the preferred method) or a change list can be generated for someone to verify and do the updates manually.

An added benefit is that the sync program, or other associated programs it can call, can be programmed to carry out organizational policy and meet the needs of the organization. For example, if a user moved to a new department that required a special set of programs, the sync program can be programmed to send a message to the installation group to contact the user and schedule the installation of those programs. Likewise, it can be programmed for the removal of special programs not used in that new department that are no longer needed, thus saving license fees.

Figure 2C:
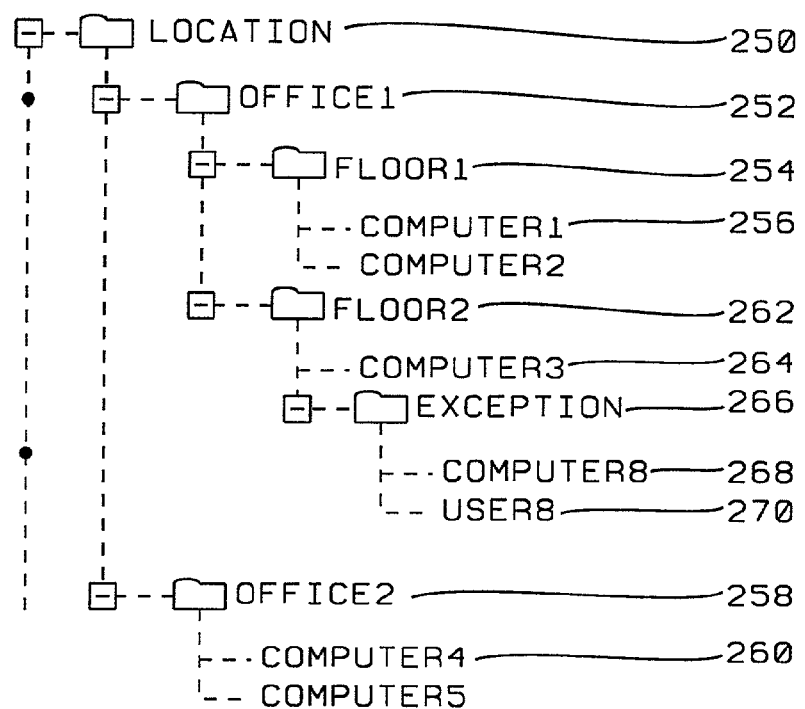
FIG. 2C illustrates a directory based on physical location in the new method.

FIG. 2C illustrates the format of the physical location directory computer database structure 250. This database, unlike the organizational directory computer database that follows the organizational structure, follows the physical structure such as office or floor and is based on the physical location of the workstations. The nodes off the root are the individual offices as in node Office1 252. Located at this directory node is a description of the location as necessary to locate any network addresses and information required to find and service this office. In the case of FIG. 2C, Office1 is a large office on two floors. Node Floor1 254 contains two computers, Computer1 and Computer2 256. The computer nodes contain the actual IP addresses of each computer attached to it. On Floor2 262 Computer3 264 is present and its node contains its IP address. On Floor2 there is Computer8 268 found in the Exception node 266. Perhaps it is located on this node because it is a dial-up computer not on the office network. User8 270, too, is on this node and could be a temporary user that brought his workstation with him to work on that floor for a short period of time, or some other exception to the network structure that is in the building. Additional offices would be added as was node Office2 258 with computers in that office being added as nodes Computer4 and Computer5 260.

Figure 2D:
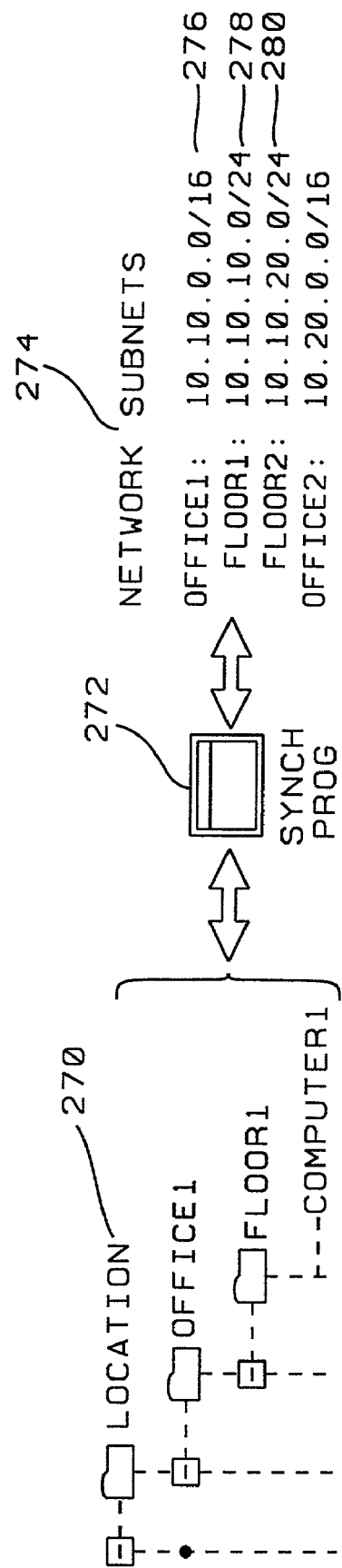
FIG. 2D is a flow diagram showing the synchronization with the network subnet database.

FIG. 2D shows the flow of running the sync program with the network subnets computer database. The physical location directory database 270 is run against network subnets database 274 using the sync program 272. The network subnets database is the master database used by the network administrators. Each of its nodes contains an IP address (set of addresses) or subnets, such as in the Office1 node shown 276. Floor1 278 shows the IP addresses on that floor, and Floor2 280 shows the IP addresses present on that floor. It is the IP network representation of the network in the building where the offices are located. It is actively maintained and kept current so that the addition of computers and their objects can be quickly given unused addresses and added to the network. Most importantly, it is used to diagnose network problems so it is kept up-to-date by the network administrators. The sync program, or an associated program it calls, can again be used to enforce organizational network policies. For example, specific departments may always need to reside inside the security of a firewall, but others may not.

The sync program 272 compares the IP address of the computer and its objects on the network. It can automatically update the physical location directory database directly and keep it current. A change list could have also been created for someone to do the updates manually, but this is not the preferred method. The physical location database is now able to be kept accurate based on the actual computer using the network. Now the location of every computer workstation is accurately known. The methods of the invention provide advantages over the prior art including that users and computer objects can be automatically managed by synchronizing the organizational directory database with the HR database and the physical location database with the network subnets database. Users and computer assets can be accurately accounted for in two different ways. Using the policy capabilities that can be built into the synchronization programs, user services can be effectively created to improve maintenance and productivity.

While the invention has been particularly shown and described with reference to preferred embodiments thereof, it will be understood by those skilled in the art that various changes in form and details may be made without departing from the spirit and scope of the invention.

What is claimed is:

1. A computer implemented method of managing users and their computers, software, and peripherals comprising the steps of:
   a. providing a directory computer database based on an organizational hierarchy;
   b. providing a layout means in said computer database to arrange data about said users, said computers, said software, and said peripherals under the organizational directory;
   c. providing a directory computer database based on physical location of said computers;
   d. providing a layout means in said computer database to arrange data about said users, said computers, said software, and said peripherals under the physical location directory;
   e. providing a software programmed means to synchronize said organizational directory computer database with a Human Resources computer database, and
   f. providing a software programmed means to synchronize said physical location directory computer database with a network subnet computer database.

2. Methods of managing users and their computers of claim 1, wherein said organizational directory can be composed of organization departments and subdepartments and their contents.

3. Methods of managing users and their computers of claim 2, wherein said layout means of said organization directory contains nodes for departments and subdepartments. users, and exception computer and user that branch from a root organization node and contains information on users and their workstations.

4. Methods of managing users and their computers of claim 1, wherein said physical location directory is composed of the physical locations of computer objects.

5. Methods of managing users and their computers of claim 4, wherein said layout means of said physical directory contains nodes for office, floor, computer, and exception computer and user that branch from a root location node and contain information about those workstations.

6. Methods of managing users and their computers of claim 1, wherein a software sync program incorporates organizational policy and information of said organizational directory with that contained in said Human Resources computer database and can automatically update said organizational directory.

7. Methods of managing users and their computers of claim 6, wherein a change list can be generated from said software sync program for manual updating of said organizational directory.

8. Methods of managing users and their computers of claim 1, wherein a software sync program incorporates said organizational policy and compares location information of said physical location directory with Internet Protocol addresses in said network subnet database and can automatically make the updates to said physical location directory.

9. Methods of managing users and their computers of claim 8, wherein a change list can be generated from said software sync program for manual updating of said physical location directory.

10. Methods of managing users and their computers of claim 1, wherein organization exceptions are allowed by coding exception nodes within said organizational directory.

11. Methods of managing users and their computers of claim 1, wherein physical location exceptions are allowed by coding exception nodes within said physical location directory.

12. A computer implemented method of inventorying users and their computer workstations connected to a network, comprising the steps of:
   a. providing a directory computer database based on organizational hierarchy;
   b. providing a layout means on said computer database to arrange data about said users and their computer workstations;
   c. providing a directory computer database based on physical location of said computer workstations;
   d. providing a layout means in said computer database to arrange data about said users and their computer workstations under the physical location directory;
   e. providing a software programmed means to synchronize the organizational directory computer dataset with a Human Resources computer database; and
   f. providing a software programmed means to synchronize the physical location directory computer database with a network subnet computer database.

13. Methods for inventorying users and their computer workstations of claim 12, wherein said organizational directory can be composed of organization departments and subdepartments and their contents.

14. Methods of inventorying users and their computer workstations of claim 13, wherein said layout means of said organizational directory contains nodes for departments and subdepartments, users, and exception computer and user that branch from a root organization node and contain organization and department information.

15. Methods of inventorying users and their computer workstations of claim 12, wherein said physical location directory is composed of the physical locations of said computer workstations.

16. Methods of inventorying users and their computer workstations of claim 15, wherein said layout means of said physical directory contains nodes for office, floor, computer, and exception computer and user that branch from a root location node and contain information of those workstations.

17. Methods of inventorying users and their computer workstations of claim 12, wherein a software sync program incorporates organizational policy and compares user information of said organizational directory with that contained in said Human Resources computer database and can update said organizational directory.

18. Methods of inventorying users and their computer workstations of claim 17, wherein a change list can be generated from said software sync program for manual updating of said organizational directory.

19. Methods of inventorying users and their computer workstations of claim 12, wherein a software sync program incorporates said organizational policy and compares location information of said physical location directory with Internet Protocol addresses contained in said network subnet computer database and can automatically make updates to said physical location directory.

20. Methods for inventorying users and their computer workstations of claim 19, wherein a change list can be generated from said software sync program for manual updating of said physical location directory.

21. Methods for inventorying users and their computer workstations of claim 12, wherein organizational exceptions are allowed by coding exception nodes within said organizational directory.

22. Methods of managing users and their computer workstations of claim 12, wherein physical location exceptions are allowed by coding exception nodes within said physical location directory.

* * * * *